Patented Apr. 30, 1940

2,199,176

UNITED STATES PATENT OFFICE 2,199,176

ANTHRAQUINONE DYESTUFFS

Robert Norman Heslop and William Wyndham Tatum, Blackley, Manchester, England, assignors to Imperial Chemical Industries Limited, a corporation of Great Britain No Drawing. Application June 6, 1938, Serial No. 212,189. In Great Britain June 9, 1937

3 Claims. (Cl. 260—371)

This invention relates to anthraquinone dyestuffs.

This invention has as an object to provide new anthraquinone dyestuffs. A further object is to provide new anthraquinone dyestuffs which will dye wool and other animal fibres. A still further object is to devise methods of manufacturing such dyestuffs. Further objects will appear hereinafter. These objects are accomplished by the following invention.

We have found that if we interact $\alpha\beta$-diphenylethylamine with an anthraquinone derivative which contains replaceable substituents either in the 1 and 4, or 1 and 5, positions, and then sulphonate the resulting interaction products we obtain a 1,4 or a 1,5 bis-($\alpha\beta$-diphenylethylamino)-anthraquinonesulphonic acid which is a dyestuff yielding on wool and other animal fibres very bright colouring of very good fastness.

The replaceable substituents may be either halogen atoms, or nitro, hydroxy, amino or sulpho groups.

The anthraquinone starting materials may contain beside the replaceable substituents other substituents such as halogen atoms, methyl, amino, or hydroxy.

The following examples illustrate but do not limit the invention. The parts are by weight.

Example 1

Stir together 3.4 parts of leucoquinizarin, 6.6 parts of quinizarin, 40 parts of butyl alcohol and 25 parts of $\alpha\beta$-diphenylethylamine (prepared as described by Leuchart and Janssen, Ber., 1889, 22, p. 1409), in an inert (e. g. coal-gas) atmosphere, at 108–110° C. for 12 hours. Cool, leave to crystallise, filter off the reaction product, wash with ethyl alcohol and crystallise from pyridine. 1:4 - bis-($\alpha\beta$-diphenylethylamino) anthraquinone, is thus obtained as bright bluish-purple needles of m. p. 251–253° C. which are soluble in hot benzene with a bright blue colour.

Stir 3 parts of the compound thus obtained into 30 parts of 10% oleum in which 3 parts of anhydrous sodium sulphate have been dissolved, at 0–2° C. and continue stirring for 15–30 minutes. Pour on to ice and water, filter off the dyestuff, suspend the dyestuff in 600 parts of boiling water, and add 10% sodium carbonate solution until the solution is alkaline to Brilliant Yellow paper. Filter the solution while hot, add 18 parts of sodium chloride, filter off the precipitated dyestuff and dry.

The product is an acid dyestuff for animal fibres. For example, on wool it gives very bright reddish-blue dyeings, of very good fastness to washing, milling and light.

Example 2

Stir together 12 parts of leuco-1,4-diaminoanthraquinone, 100 parts of butyl alcohol and 40 parts of $\alpha\beta$-diphenylethylamine at 115–120° C. for 18 hours. Add 0.5 part of copper acetate and pass a slow stream of air into the hot melt, while still stirring, until an intense blue colour develops. Allow to cool, filter off the reaction product, wash with butyl alcohol and crystallise from aniline. The 1,4-bis-($\alpha\beta$-diphenylethyl) aminoanthraquinone thus obtained is identical with that described in Example 1, and it is sulphonated as described in Example 1.

Example 3

Stir together 5 parts of 1,5-dichloroanthraquinone, 25 parts of $\alpha\beta$-diphenylethylamine, 0.1 part of copper acetate and 4 parts of anhydrous potassium acetate at 160–165° C. for 16 hours. Cool to 110° C., dilute the intensely red coloured melt with 20 parts of butyl alcohol and leave to cool and crystallise. Filter off the crystals, wash them with ethyl alcohol, and then with hot water. Recrystallise from pyridine. 1,5-bis-($\alpha\beta$-diphenylethylamino) anthraquinone is obtained in red leaflets, m. p. 276–278° C.

Stir 1.9 parts of 1,5-bis-($\alpha\beta$-diphenylethylamino)-anthraquinone into a solution of 1.9 parts of urea in 25 parts of 5% oleum at 0–2° C. and continue stirring for 1 hour at this temperature. Pour on to a mixture of ice and aqueous sodium chloride solution, filter off the dyestuff, suspend in 300 parts of boiling water and add dilute sodium carbonate solution until the solution is just alkaline to Brilliant Yellow paper. Filter while hot, add 9 parts of sodium chloride to the filtrates, filter off the precipitated dyestuff and dry. The dyestuff gives bright bluish-red dyeings on wool of very good fastness to washing and milling.

Example 4

Stir together 10 parts of 1,8-diamino-4,5-dihydroxyanthraquinone, 10 parts of sodium hydrosulphite, 21.8 parts of $\alpha\beta$-diphenylethylamine, and 75 parts of ethyl alcohol at 80–85° C., for 16 hours, dilute with ethyl, cool and filter. Wash the filtercake with ethyl alcohol and water and dry. Dissolve in 100 parts of hot nitrobenzene, cool, filter and isolate the dyestuff base by steam distillation of the filtrates.

Grind 3 parts of the dyestuff base with 3 parts of filtercel and add the mixture at 0° C. in small portions, to about 30 parts of 9% oleum, (in which have been dissolved 3 parts of ammonium sulphate), stir for one hour at 0-3° C., pour on to ice, filter off and wash the dyestuff with aqueous sodium chloride solution. Stir the dyestuff paste with 500 parts of water, neutralise with sodium carbonate, boil and filter, precipitate the dyestuff from the filtrate with sodium chloride.

The resulting dyestuff dyes wool in greenish-blue shades which have very good fastness to severe washing, perspiration, milling and sea water. The dyestuff appears to be 1-amino-5,8-bis-($\alpha\beta$-diphenylethylamino)-4-hydroxyanthraquinone-sulphonic acid.

As shown in Examples 1 and 2 we may with advantage in the case of hydroxy- and/or amino-anthraquinones apply the starting material wholly or partly in the form of its leuco derivative. The leuco derivative may be previously prepared, or may be prepared in situ by adding a suitable reducing agent (e. g. sodium hydrosulphite) with the diphenylethylamine.

This invention is a valuable advance in the art giving a new range of wool dyestuffs which combine brilliance of shade with very good fastness to washing, milling, light, and perspiration.

As many apparently widely different embodiments of this invention may be made without departing from the spirit and scope thereof, it is to be understood that we do not limit ourselves to the specific embodiments thereof except as defined in the appended claims.

We claim:

1. Compounds of the class consisting of alpha-alpha - bis(alpha - beta-diphenylethylamino) anthraquinones which carry the two diphenylethylamino radicals in one of the pairs of positions 1,4 and 1,5, their sulfonation derivatives and the alkali metal salts of said sulfonation derivatives.

2. Compounds of the class consisting of 1,4-bis(alpha - beta -diphenylethylamino) anthraquinonesulfonic acid and its alkali metal salts.

3. Compounds of the class consisting of 1,5-bis(alpha - beta - diphenylethylamino) anthraquinonesulfonic acid, and its alkali metal salts.

ROBERT NORMAN HESLOP.
WILLIAM WYNDHAM TATUM.